United States Patent [19]

Michel

[11] Patent Number: 4,927,615

[45] Date of Patent: May 22, 1990

[54] CRYSTALLINE SODIUM/ALUMINUM ACID PHOSPHATES

[75] Inventor: Paul Michel, Lyons, France

[73] Assignee: Rhone-Poulenc Chimie, Courbevoie, France

[21] Appl. No.: 260,719

[22] Filed: Oct. 21, 1988

[30] Foreign Application Priority Data

Oct. 21, 1987 [FR] France ................................ 87 14520

[51] Int. Cl.$^5$ ........................ C01B 15/16; C01B 25/26
[52] U.S. Cl. .................................... 423/305; 423/306; 423/307; 423/308
[58] Field of Search ............... 423/305, 306, 307, 308, 423/DIG. 16, 0.5

[56] References Cited

U.S. PATENT DOCUMENTS 4,704,211 11/1987 Avel et al. .......................... 423/306

Primary Examiner—Gregory A. Heller
Attorney, Agent, or Firm—Burns, Doane, Swecker & Mathis

[57] ABSTRACT

Crystalline sodium/aluminum acid phosphates having the formula:

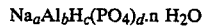

$Na_aAl_bH_c(PO_4)_d \cdot n\ H_2O$ wherein a ranges from 0.6 to 3.3, b ranges from 1.8 to 3.3, c ranges from 12 to 16, d ranges from 7 to 9, and n ranges from 0 to 5, with the proviso that $a+3b+c=3d$, and especially the compound $NaAl_3H_{14}(PO_4)_8 \cdot 4H_2O$, are prepared by coating and drying an atomized precursor solution of stoichiometrically desired acid phosphate on inert solid particles comprising a fluidized bed.

15 Claims, No Drawings

CRYSTALLINE SODIUM/ALUMINUM ACID PHOSPHATES

BACKGROUND OF THE INVENTION

1. Field of the Invention

The present invention relates to the preparation of crystallized aluminum and sodium acid phosphates having the following general formula:

$$Na_aAl_bH_c(PO_4)_d \cdot n\,H_2O$$

wherein a, b, c, d and n are numbers respectively ranging from 0.6 to 3.3; 1.8 to 3.3; 12 to 16; 7 to 9; and 0 to 5, with the proviso that $a+3b+c=3d$.

2. Description of the Prior Art

The acid phosphates of aluminum and sodium (SAP) are compounds well known to this art which in recent years have found widespread applications in the food industry.

They are used, in particular, as delayed action baking powders for a certain number of bakery and/or pastry products, as additives to control the melting of cheeses, and as additives for the fixation of fats in meats.

The compound having the formula of $NaAl_3H_{14}(PO_4)_8 \cdot 4\,H_2O$ is presently the one of greatest industrial importance, as it has been recognized and approved for many years as the common acid baking powder in leavened dough.

To date, two principal processes are known for the preparation of crystallized SAP.

The first, described particularly in U.S. Pat. No. 2,550,490, is a process of the discontinuous type, designated the "methanol process". It entails concentrating and then crystallizing a solution of the precursor of the desired SAP until a highly viscous slurry containing SAP crystals is produced, then separating the crystals from the crystallization medium by filtration. A resuspension is first carried out by the addition of methanol.

This process exhibits two major disadvantages. On the one hand, it requires methanol, which is a highly flammable and toxic compound requiring subsequent purification stages, and, one the other, powerful and very expensive agitating equipment must be used, in view of the extreme variations in the viscosity of the medium over the course of the operation.

The second process, described in U.S. Pat. No. 3,311,448, is based on continuous crystallization using separate zones for the reaction and the subsequent crystallization of the precursor solution.

In actual practice, these two stages are carried out continuously in a conveyor-kneader type apparatus maintained at elevated temperatures, with the precursor solution entering at one end of the apparatus and the crystallized SAP exiting at the other end.

Unfortunately, the industrial application of this process requires a great investment relative to the apparatus, which is voluminous, expensive and consumes much energy, which obviously is a severe economic restraint militating against the use of this particular process.

Furthermore, both of the aforementioned processes have the disadvantage of requiring delicate controls, and consequently produce final products of constant quality only with extreme difficulty.

By "quality" are principally intended, on the one hand, the stoichiometry (and more particularly the number of molecules of the water of crystallization) and, on the other, the degree of crystallization of the final product.

The latter parameter is, among others, of great importance relative to the properties of the SAP for ultimate use. Thus, in a general manner, it is observed that a perfectly crystallized SAP has better delayed reaction properties with the bicarbonate when used as a leavening agent, and, also, that it is very weakly hygroscopic, which eliminates setting of the product mass, which remains a severe industrial problem during the storage and/or handling of the material.

To offset the poor hygroscopic properties (thus, the poor crystallinity) of the SAP produced by the conventional processes described above, it has been proposed to this art to add various stabilizing agents thereto, such as potassium. But this objectionably adds to the overall cost of manufacturing.

SUMMARY OF THE INVENTION

Accordingly, a major object of the present invention is the provision of a simple, efficient, economical and readily carried out improved process for the preparation of perfectly crystallized aluminum and sodium acid phosphates of constant stoichiometry, which improved process is both reliable and reproducible.

Briefly, the present invention features a process for the preparation of crystallized aluminum and sodium acid phosphates having the following general formula:

$$Na_aAl_bH_c(PO_4)_d \cdot n\,H_2O$$

wherein a ranges from 0.6 to 3.3; b ranges from 1.8 to 3.3; c ranges from 12 to 16; d ranges from 7 to 9 and n ranges from 0 to 5, with the proviso that $a+3b+c=3d$, said process comprising pulverizing a precursor solution of such acid phosphate on a fluidized bed of solid particles.

Thus, this invention features continuously coating a mass of support particles, which are maintained in a state of constant agitation, with a spray of fine droplets formed by pulverization. The function of the support particles is to ensure the drying and crystallization of the droplets deposited onto their surface; the solvent evaporates, while the dry solids are deposited in successive layers on the surface of the support particles, thereby producing the desired final product.

DETAILED DESCRIPTION OF THE PREFERRED EMBODIMENTS OF THE INVENTION

More particularly according to the present invention, the preparation of the starting material precursor solution is conventional and may be carried out using any one of the various different techniques well known to this art.

The typical such processes entail reacting a sodium compound (hydroxide, carbonate, hydrogenocarbonate, and the like) and a trivalent aluminum compound (alumina, hydroxide, and the like) with aqueous phosphoric acid maintained essentially between ambient temperature and its boiling point, the proportions existing among the different reagents in the initial solution being adjusted conventionally as a function of the stoichiometry desired in the final product.

The initial solution may also be prepared by reacting an aqueous solution of aluminum acid phosphate with a sodium compound, as described in U.S. Pat. No. 3,501,314, hereby incorporated by reference. The solution prepared in this manner is then atomized, i.e., converted into a plurality of fine droplets. This atomization may be carried out by any known means, in particular by an atomizing nozzle of the sprinkler type, or others. As regards the different atomizing techniques suitable according to the present invention, reference is made, in particular, to the text by Masters entitled *SPRAY-DRYING* (Second edition, George Goldwin Publisher, London (1976)).

Consistent herewith, the atomization is onto an agitated (fluidized) bed of solid particles.

By the term "agitated bed" is intended an entire mass of particles maintained in constant motion with respect to each other by any suitable means, mechanical or otherwise.

The temperature of the bed should be sufficient to ensure the drying and crystallization of the droplets produced by atomization. In actual practice, this temperature generally ranges from 50° to 150° C., preferably from 60° to 100° C.

A particularly preferred embodiment for carrying out the process of the invention comprises fluidizing the bed of solid particles using a stream of gas.

According to this method, the solid particles are introduced into a reactor, which are then fluidized and maintained in this state by means of a flowstream of gas, typically introduced through the base of the reactor.

In a preferred embodiment of the invention, a stream of hot air is used, in a manner such that the functions of expansion (fluidization), on the one hand, and the heating of the fluidized bed on the other, are carried out simultaneously by the same agent.

The inlet temperature of the gaseous flowstream typically ranges from 100° to 180° C. and its outlet temperature generally ranges from 50° to 150° C., these temperatures obviously being adjusted as a function of the usual considerations of gaseous flow, the mass to be suspended and the temperature of the bed sought to be attained.

The aforedescribed precursor solution is then continuously atomized onto said bed of fluidized particles, the individual particles then being gradually coated by successive layers of aluminum and sodium acid phosphate, whether already crystallized or undergoing the process of crystallization.

In another preferred embodiment of the invention, the average retention or dwell time in the reactor of a coated particle is adjusted to range from one to several hours, in order to effect perfect crystallization of the phosphate.

The nature of the particles constituting the fluidized bed is not critical; however, these particles must be chemically inert relative to the acid phosphate sought to be produced. Therefore, they may be glass, metal or ceramic particles, or particles of the acid phosphate desired.

In another preferred embodiment of the invention, small particles, of glass for example, are introduced into a reactor, then fluidized by a method described above. The precursor solution of the phosphate is then atomized onto said particles and the coated particulates are continuously removed from the fluidized bed. Thereafter, the coatings, which constitute the desired final product, are removed from the glass particles by any known means, for example by attrition, and the glass particles stripped of their coatings are recycled into the fluidized bed to again be coated.

The process thus operates continuously.

In an even more preferred embodiment of the invention, the fluidized particles are crystals of the phosphate sought to be produced. The coated particles removed from the fluidized bed are ground and a fraction of the powder produced in this manner is recycled to the agitated bed to serve as the support particulates, while the other fraction constitutes the desired final product. Here again, the process is carried out continuously.

The final product powder of the aluminum and sodium acid phosphate may optionally be subjected to a supplementary grinding stage intended to provide a rigorously controlled grain size distribution.

Analysis shows that in all cases the powders produced by the process according to the invention are perfectly crystallized, perfectly homogeneous in composition, and exhibit no deviation from the stoichiometry of the starting material solution.

The process according to this invention is thus especially suitable for the preparation of crystallized phosphates of the formula:

$$NaAl_3H_{14}(PO_4)_8 \cdot 4 H_2O$$

It will be appreciated that it is possible, if necessary, to introduce into the final product acid phosphates certain agents adopted to decrease even further their hygroscopicity.

Such agents are well known to this art; in particular they are potassium, calcium or silica.

Potassium and calcium may be introduced either during the preparation of the initial precursor solution (in the form of a hydroxide, a carbonate, a hydrogenocarbonate, a phosphate, or the like), or by mixing it into the acid phosphate obtained upon completion of the process.

Silica ($SiO_2$) is added upon completion of the process by mixing the respective powders together.

The amounts of the doping agents K, Ca and S optionally introduced must be such that the final product has the following general formula:

$$Na_aK_xCa_y(SiO_2)_zAl_bH_c(PO_4)_d$$

wherein the indices a, b, c, d and n are as defined above, and the indices x, y and z represent numbers respectively ranging from 0 to 0.2; 0 to 0.2 and 0 to 0.1 (it will be appreciated that the foregoing indices must be such as to impart overall electrical neutrality).

In order to further illustrate the present invention and the advantages thereof, the following specific examples are given, it being understood that same are intended only as illustrative and in nowise limitative.

EXAMPLE 1

To 1045.5 g of 75% phosphoric acid, 235.0 g of an aluminum hydroxide solution (66.5% $Al_2O_3$) were added. The resulting suspension wa heated to reflux under agitation until all solids were completely dissolved. The solution obtained in this manner was cooled to 50° C. 85 g sodium hydrogenocarbonate in solution in 934 g water were then added slowly, under agitation. A solution with a 39.7% dry solids content at 120° C. was obtained, which was perfectly clear and stable for several months at ambient temperature.

This solution, preheated to 50° C., was atomized at a rate of 6 kg/h onto a fluidized bed of particles of the same composition, maintained in fluid state by a flow of hot air at 140° C. After an average retention time in the reactor on the order of 2 h, a final product was produced in the form of "nondusting" granules at a rate of 40 kg/h/m². After grinding, the resulting particles exhibited the remarkable characteristic of being perfectly crystallized, very weakly hygroscopic and nonadhesive.

Physico/chemical analysis confirmed a crystalline structure of the formula:

$$NaAl_3H_{14}(PO_4)_8 \cdot 4 H_2O.$$

EXAMPLE 2

To 522.7 g of 75% phosphoric acid the following materials were added, in sequence:

(i) 117.6 g aluminum hydroxide Al(OH)₃; the resulting suspension being agitated and heated to 108° C. until complete dissolution was effected;

(ii) 2.55 g calcium carbonate, CaCO₃;

(iii) 5.06 g potassium bicarbonate in solution in 93 g water; and (iv) 33.6 g sodium hydrogenocarbonate, NaHCO₃, in solution in 373 g water.

After agitation for 1 hour, a solution having a dry solids content of 39.1 at 120° C. was obtained; it was clear and stable.

This solution was dried under the same condition as those described in Example 1. After grinding, the resulting powder had an excellent resistance to humidity in the ambient atmosphere.

X-ray diffraction analysis showed that the powder was homogeneous and perfectly crystallized. It had the overall formula:

$$Na_{0.8}K_{0.1}Ca_{0.05}Al_3H_{14}(PO_4)_8 \cdot 3.8 H_2O.$$

EXAMPLE 3

In this example, the same final product was prepared as in Example 1.

To 1045.5 g of 75% phosphoric acid the following materials were added, in sequence:

(i) 235.0 g of Al(OH)₃ under agitation and heating to reflux, to complete dissolution;

(ii) 26.6 g sodium carbonate Na₂CO₃ dissolved in 133 g water; and (iii) 42 g sodium hydrogenocarbonate, NaHCO₃, dissolved in 476 g water.

After reaction, the solution was clear and stable; its dry solids content at 120° C. was increased to 48.1% by weight.

This solution (d=1.44), which was highly viscous at ambient temperature, was dried under the same conditions as in the preceding examples, but with improved productivity.

Physico/chemical analysis of the powder obtained after grinding showed that its overall formula was:

$$NaAl_3H_{14}(PO_4)_8 \cdot 4 H_2O$$

in a perfectly crystallized and nonadhesive form.

EXAMPLE 4

This example illustrates another mode of preparation of the starting material precursor solution.

To 20.0 kg of monoaluminum phosphate solution having a dry solids content of 50%, heated to reflux, 0.396 kg Al₂O₃ was added.

After dissolution, the solution was cooled to 50° C. and 0.625 kg Na₂CO₃ was added. After the reaction, the resulting solution was clear and highly viscous.

This solution, preheated to 60° C., was dried as in Example 1 on a fluidized bed of particles of the same composition.

A perfectly crystallized homogeneous product of the following overall formula was produced:

$$NaAl_{3.3}H_{13.1}(PO_4)_8 \cdot 4.3 H_2O$$

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a crystalline aluminum and sodium acid phosphate having the following general formula:

$$Na_aAl_bH_c(PO_4)_d \cdot n H_2O$$

wherein a ranges from 0.6 to 3.3, b ranges from 1.8 to 3.3, c ranges from 12 to 16, d ranges from 7 to 9, and n ranges from 0 to 5, with the proviso that a+3b+c=3d, comprising coating and drying an atomized precursor solution of such acid phosphate on inert solid particles which comprise a fluidized bed thereof.

2. The process as defined by claim 1, further comprising stripping dried crystalline acid phosphate coatings from said inert solid particles.

3. The process as defined by claim 1, wherein the temperature of said fluidized bed ranges from 50° to 150° C.

4. The process as defined by claim 3, wherein the temperature of said fluidized bed ranges from 60° to 100° C.

5. The process as defined by claim 1, comprising fluidizing said bed with a stream of gas.

6. The process as defined by claim 5, said stream of gas comprising hot air.

7. The process as defined by claim 6, the inlet temperature of the hot air ranging from 100° to 180° C.

8. The process as defined by claim 7, the outlet temperature of the hot air ranging from 50° to 100° C.

9. The process as defined by claim 1, said inert solid particles comprising glass, a metal, or a ceramic material.

10. The process as defined by claim 1, said inert solid particles comprising crystals of the desired acid phosphate.

11. The process as defined by claim 1, further comprising incorporating a hygroscopicity decreasing amount of potassium, calcium or silica values in said crystalline acid phosphate final product.

12. The process as defined by claim 11, for preparing an acid phosphate of the formula:

$$Na_aK_xCa_y(SiO_2)_zAl_bH_c(PO_4)_d$$

wherein x ranges from 0 to 0.2, y ranges from 0 to 0.2 and z ranges from 0 to 0.1.

13. The process as defined by claim 1, for preparing an acid phosphate of the formula:

$NaAl_3H_{14}(PO_4)_8 \cdot 4 H_2O$.

14. The process as defined by claim 1, for preparing an acid phosphate of the formula:

$NaAl_{3.3}H_{13.1}(PO_4)_8 \cdot 4.3 H_2O$.

15. The process as defined by claim 12, for preparing an acid phosphate of the formula:

$Na_{0.8}K_{0.1}Ca_{0.05}Al_3H_{14}(PO_4)_8 \cdot 3.8 H_2O$.

* * * * *